(12) United States Patent
Hudman et al.

(10) Patent No.: US 8,711,458 B2
(45) Date of Patent: Apr. 29, 2014

(54) SCANNED IMAGE PROJECTION SYSTEM EMPLOYING INTERMEDIATE IMAGE PLANE

(75) Inventors: Joshua M. Hudman, Issaquah, WA (US); Christian Dean DeJong, Sammamish, WA (US)

(73) Assignee: Microvision, Inc., Redmond, WA (US)

( * ) Notice: Subject to any disclaimer, the term of this patent is extended or adjusted under 35 U.S.C. 154(b) by 87 days.

(21) Appl. No.: 13/466,788

(22) Filed: May 8, 2012

(65) Prior Publication Data

US 2013/0301097 A1    Nov. 14, 2013

(51) Int. Cl.
*G02B 26/08* (2006.01)

(52) U.S. Cl.
USPC ...................................... 359/212.1

(58) Field of Classification Search
CPC .... G02B 26/10; G02B 26/101; G02B 26/105; G02B 26/124; G02B 26/0833
USPC ..................... 359/204.1, 205.1, 201.1, 202.1, 359/212.1–215.1, 223.1–226.1; 353/50, 98
See application file for complete search history.

(56) References Cited

U.S. PATENT DOCUMENTS 7,614,752 B2 * 11/2009 Goto et al. ...................... 353/50

* cited by examiner

*Primary Examiner* — Euncha Cherry
(74) *Attorney, Agent, or Firm* — Kevin D. Wills (57) ABSTRACT

In imaging system (100), a spatial light modulator (101) is configured to produce images (102) by scanning a plurality light beams (104,105,106). A first optical element (107) is configured to cause the plurality of light beams to converge along an optical path (114) defined between the first optical element and the spatial light modulator. A second optical element (115) is disposed between the spatial light modulator and an output of the imaging system. The first optical element and the spatial light modulator are arranged such that an image plane (117) is created between the spatial light modulator and the second optical element. The second optical element is configured to collect the diverging light (118) from the image plane and collimate it. The second optical element then delivers the collimated light to a pupil (120) on the other side of the second optical element relative to the spatial light modulator.

15 Claims, 10 Drawing Sheets

SCANNED IMAGE PROJECTION SYSTEM EMPLOYING INTERMEDIATE IMAGE PLANE

BACKGROUND

1. Technical Field

This invention relates generally to image projection systems, and more particularly to scanned image projection systems.

2. Background Art

Scanned laser projection devices facilitate the production of brilliant images created with vibrant colors. Scanned systems, such as those manufactured by Microvision, Inc., are capable of creating bright, sharp images with a large depth of focus. Additionally, these scanned laser projection systems can be designed with compact form factors at a reasonable cost. These systems consume small amounts of power yet deliver vivid, complex images.

Scanned laser projection devices are frequently used in sophisticated projection systems such as head-up displays and near-to-eye displays. In such applications, lasers present information to a user, either by presenting the information on a projection surface or by delivering the information directly to the user's eye.

One challenge associated with these systems is size reduction. It can be desirable to make the systems smaller, so that the projection systems can be used in compact applications, such as with eyeglasses or goggles. However, as the optical components become smaller, design issues can arise. Distortion of images can be introduced. Similarly, optical artifacts can become a problem.

It would be advantageous to have a compact projection system that mitigates image distortion.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF EMBODIMENTS OF THE INVENTION

Before describing in detail embodiments that are in accordance with the present invention, it will be appreciated that embodiments of the invention described herein may be comprised of one or more conventional processors and unique stored program instructions that control the one or more processors to implement, in conjunction with certain non-processor circuits, some, most, or all of the functions of employing an intermediate image plane in a scanning projection system as described herein.

The non-processor circuits may include, but are not limited to, microprocessors, scanning mirrors, image encoding devices, memory devices, clock circuits, power circuits, and so forth. As such, these functions may be interpreted as steps of a method to use an intermediate image plane in a scanning projection system. It is expected that one of ordinary skill, notwithstanding possibly significant effort and many design choices motivated by, for example, available time, current technology, and economic considerations, when guided by the concepts and principles disclosed herein will be readily capable of generating such programs and circuits with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the present invention employ optical elements and a spatial light modulator to create images. In one embodiment, the optical elements are arranges such that light converges as it is delivered to the spatial light modulator. Once scanned by the spatial light modulator, the scanned light then defines an intermediate image plane within the system. Illustrating by example, a first optical element is arranged so as to cause a plurality of light beams created by a plurality of light sources to converge as they travel from the light sources to the spatial light modulator. The spatial light modulator then scans the plurality of light beams. The convergence causes an image plane to be defined between the spatial light modulator and a second optical element. The second optical element then collects diverging light from the intermediate image plane at an input side of the second optical element and reimages the light to one of a finite or infinite conjugate. In one embodiment, the reimaging includes collimation of the light. When collimated, the second optical element can cause the collimated light to define a pupil on an output side of the second optical element.

In one or more embodiments, a second reflective device, which itself may be a spatial light modulator, is disposed opposite the second optical element from the spatial light modulator. In such an embodiment, the second optical element can be configured to create an image pupil on the second reflective device. Light from the second reflective device can be output by the system to create images in one embodiment. In another embodiment, additional optical devices can be used to translate the light and create additional pupils as required by a particular application.

The use of an intermediate image plane within an imaging system offers numerous advantages over prior art designs. A first advantage is that the components of the system can be made smaller when the light is configured to define an intermediate image plane within the image projection system. This advantage is particularly applicable to scanning image systems where the spatial light modulator is configured to create images by pivoting along one or more axes, such as in a raster pattern. Illustrating again by example, when two spatial light modulators are used to create images in a raster pattern, with a first spatial light modulator scanning along a horizontal axis and the second spatial light modulator scanning along a vertical axis, the inclusion of an optical element between the modulators—combined with the creation of the intermediate image plane—allows for the second modulator to be much smaller.

If, for instance, the first spatial light modulator scans at an angle of fourteen degrees, and the second spatial light modulator is ten millimeters away, the second spatial light modulator must be large to handle the large spot defined by the scan angle of, and distance from, the first spatial light modulator. By using an intermediate image plane and an intermediate optical element disposed between the spatial light modulators, the second spatial light modulator can be very small when the optical element causes the diverging light from the image plane to become a pupil at the second light modulator.

Another advantage is that the creation and use of the intermediate image plane allows the designer to trade image spot size occurring on the spatial light modulator for field of view to both use smaller components and to tailor a particular imaging device to a specific application. Said differently, the designer can design the optical elements of the system to convert the rations of Θ and D to meet a desired Θ or D, while preserving the Θ*D product. Considering the pupil is directly related to the necessary modulator surface area, and the field of view being defined by the angle at which the modulator can scan, there is a one-to-one trade on field of view and pupil size when an intermediate image plane is employed. If a designer wants a larger field of view with a smaller pupil, this can be achieved by proper orientation and selection of the optical elements. With some technologies it can be easier to build a modulator having a surface area of one-half millimeter than it is to build one having a surface area of one millimeter, the smaller modulator can be used in accordance with embodiments described below to achieve the same field of view. Thus, instead of building a one-millimeter modulator with a twenty-degree scan angle, a designer can build a half-millimeter mirror with a forty-degree scan angle and then and scale it back to the original design due to the one-to-one trade on field of view and pupil size.

With some technologies it is easier, smaller, or more power or cost efficient to build a two-millimeter wide mirror with ten-degree scan angle than to build a one-millimeter wide mirror with a twenty-degree scan angle. Thus, in accordance with one or more embodiments of the invention, a two-millimeter mirror can be built. Then using proper selection and placement of the intermediate optics, a conversion of that mirror into a one-millimeter pupil having a twenty-degree scan angle can occur. It is also the case that one device employing embodiments of the invention may desire a one-millimeter pupil with a forty-five degree scan angle, while another device desires a 1.5 millimeter pupil with a thirty-degree scan angle, while yet another third device desires a two-millimeter pupil and a 22.5 degree field of view. Advantageously, using the pupil and field of view scaling available with the optical elements and an intermediate image plane of embodiments of the present invention, all three devices can use the same scanning engine, which results in significant cost savings.

A third advantage is relates to the C6 safety coefficient set forth in numerous laser classification standards. When using lasers as the light sources, safety ratings like the C6 measurement relate to the worst-case scenario, which occurs when the eye focused directly at the source of the image. In a scanning image projection system, the worst-case scenario occurs when the eye is focused directly on a spatial light modulator. In this scenario, the eye images the pupil defined along the surface of the spatial light modulator. If that pupil, or spot, is bigger than something upon which the eye can focus, i.e., is large enough that the eye is unable to receive all the energy and focus it in a spot on the retina, the C6 coefficient accounts for the resulting energy being spread over the retina. The larger the spot on the retina, the larger the C6 coefficient. The use of the intermediate image plane allows the locations of the various pupils of the system to be controlled, thereby allowing the designer to have more control over the C6 factor. Said differently, embodiments of the present invention allow a designer to change the "apparent" spot size on a spatial light modulator, thereby yielding a larger C6. Other advantages will be noted in the description of the figures that follows.

Figure 1:
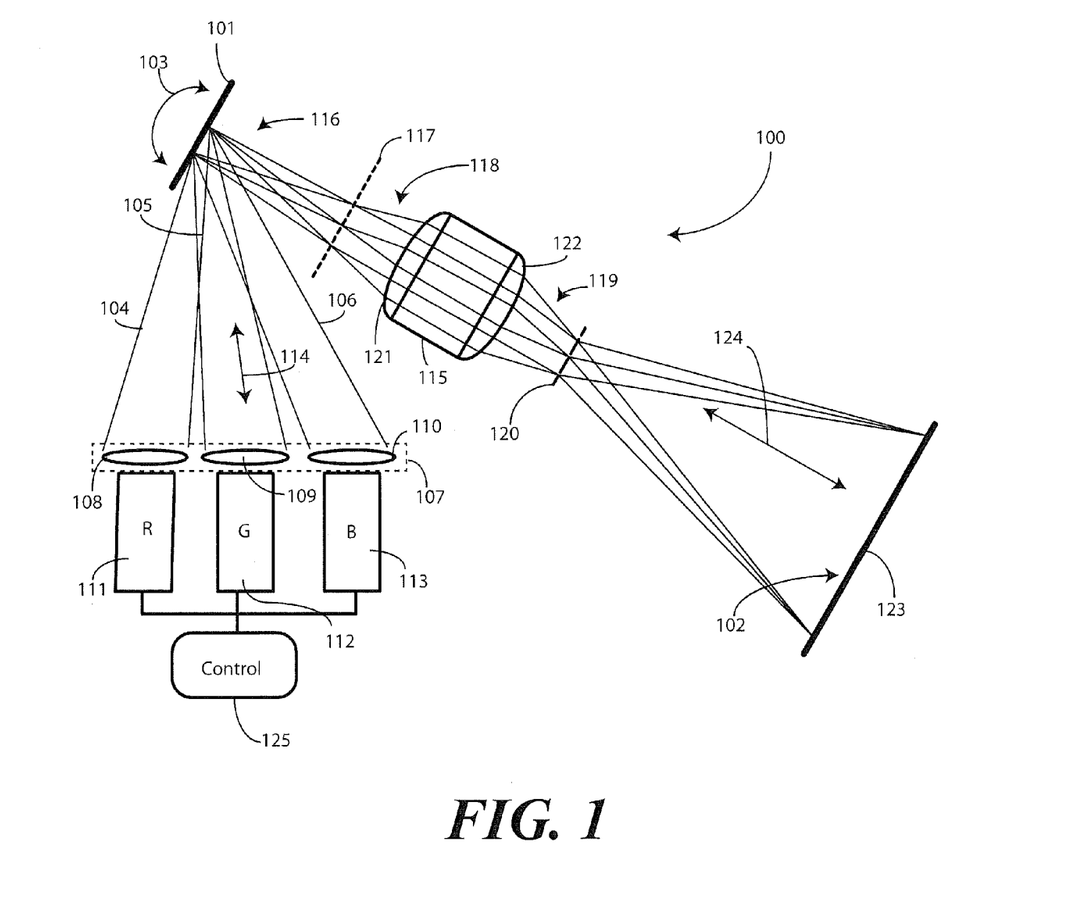
FIG. 1 illustrates one scanning image projection system employing an intermediate image plane in accordance with one or more embodiments of the invention.

Turning now to FIG. 1, illustrated therein is one embodiment of an imaging system 100 configured in accordance with one or more embodiments of the invention. As shown in FIG. 1, a spatial light modulator 101 is configured to produce images by scanning 103 a plurality of light beams 104,105, 106. A first optical element 107 is disposed at an output of a plurality of light sources 111,112,113. In the illustrative embodiment of FIG. 1, the first optical element 107 is configured as three optical elements 108,109,110 disposed at the outputs of the light sources 111,112,113. The first optical element 107 in this embodiment is configured as being a first powered optical element 108, a second powered optical element 109, and a third powered optical element 110, each being disposed at an output of a first light source 112, a second light source 113, and a third light source 113, respectively. The first powered optical element 108, a second powered optical element 109, and a third powered optical element 110 of this embodiment correspond to the plurality of light sources 111,112,113 on a one-to-one basis.

Figure 2:
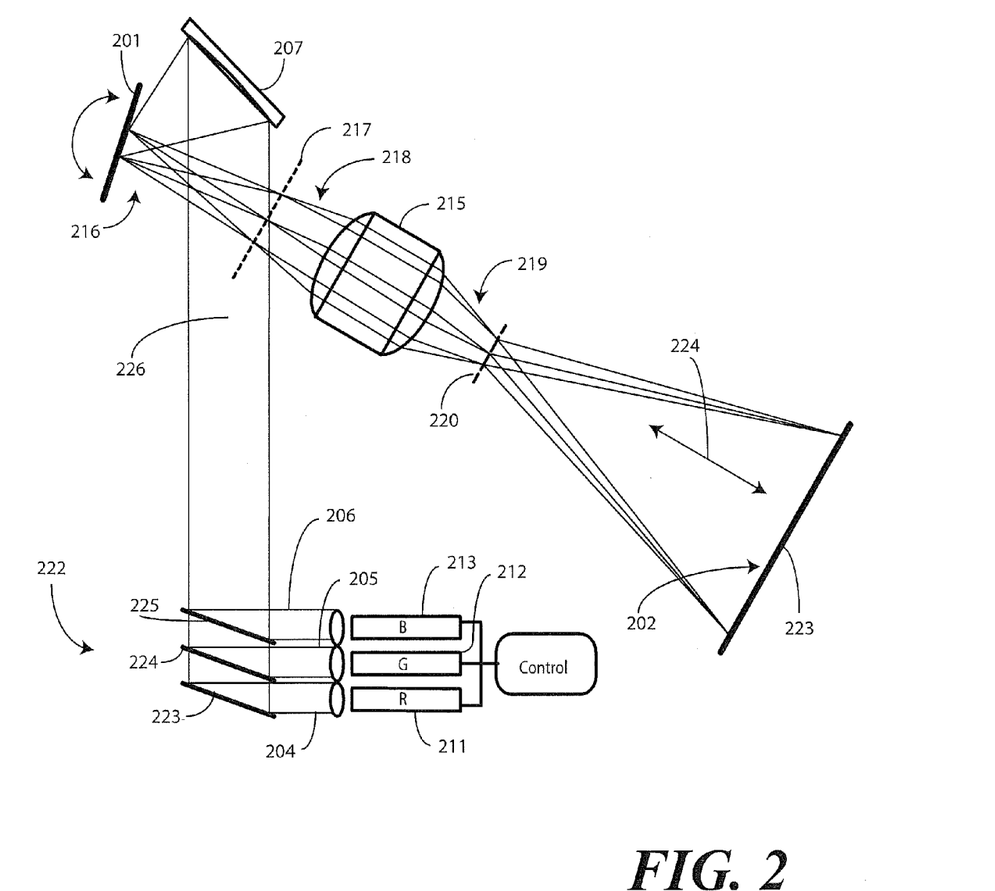
FIG. 2 illustrates another scanning image projection system employing an intermediate image plane in accordance with one or more embodiments of the invention.
Figure 3:
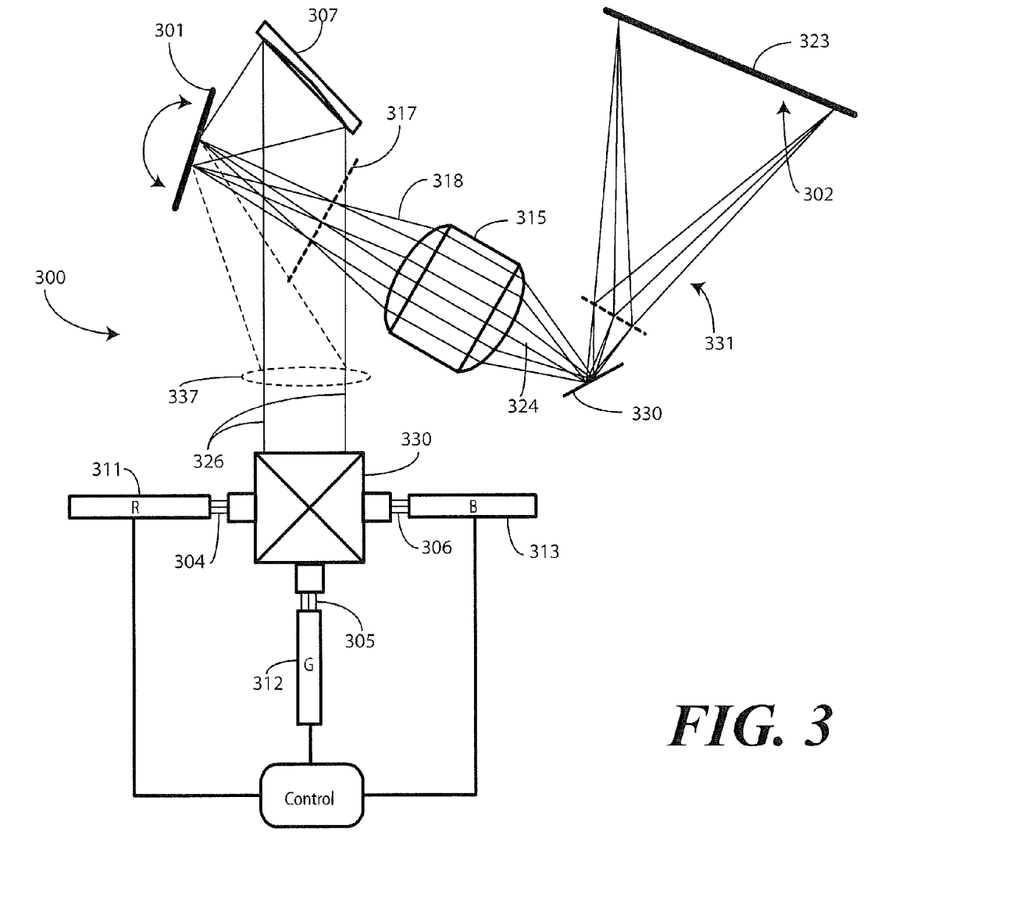
FIG. 3 illustrates another scanning image projection system employing an intermediate image plane in accordance with one or more embodiments of the invention.

While the plurality of light sources 111,112,113 is shown for simplicity in FIG. 1 as delivering light directly to the spatial light modulator 101 through the three optical elements 108,109,110, it will be clear to those of ordinary skill in the art having the benefit of this disclosure that additional optical elements may be disposed between the plurality of light sources 111,112,113 and the spatial light modulator 101. To wit, FIGS. 2 and 3 illustrate two examples of the additional optical elements that may be used. FIG. 2 illustrates dichroic mirrors (223,224,225) being disposed between the plurality of light sources (211,212,213) to take light from each source and collimate it into a common beam (226). Similarly, FIG. 3 uses an optical combiner (330) to combine beams from the light sources (311,312,313) into a common beam (326). It should be understood that while such elements have been omitted from some embodiments for ease of illustration, that dichroic mirrors, beam combiners, or other optical elements can be used to combine the output of each light source in any of the embodiments described herein. Alternatively, light can be fed from the various sources to the spatial light modulator 101 without beam combination as well.

In other embodiments, the first optical element 107 may include one or more powered optical elements that do not correspond to the light sources 111,112,113 on a one-to-one basis. For example the first light source 111 may use one powered optical element, while the second light source 112 and third light source 113 share a common powered optical element, and so forth. Other combinations and arrangements will be obvious to those of ordinary skill in the art having the benefit of this disclosure.

As shown in FIG. 1, the first optical element 107 is configured to cause the plurality of light beams 104,105,106 to converge along an optical path 114 defined between the first optical element 107 and the spatial light modulator 101. Said differently the plurality of light beams 104,105,106 get closer together as they travel toward the spatial light modulator 101. A second optical element 115 is then disposed between the spatial light modulator 101 and an output of the imaging system 100.

In the illustrative embodiment of FIG. 1, the first optical element 107 and the spatial light modulator 101 are arranged such that an intermediate image plane 117, where each pixel of the scanned light 116 is in focus, is created, defined, and exists between the spatial light modulator 101 and the second optical element 115. The second optical element 115 is then configured to collect diverging light 118 from the image plane 117 at an input side 121 of the second optical element 115, shown here as a convex surface, and collimate the collected, diverging light. The second optical element 115 then causes the collimated light 119 to converge from an output side 122 of the second optical element 115 along a second optical axis 124 to a pupil 120. By altering the geometry, material, and location of the second optical element 115, the location of the pupil 120 can be changed as necessary in a given application. In the illustrative embodiment of FIG. 1, the pupil 120 occurs at the output of the imaging system 100. Accordingly, the collimated light 119 diverges again to a projection surface 123 where the image 102 is formed.

In the illustrative embodiment of FIG. 1, the plurality of light sources 111,112,113 includes a green light source 112, a blue light source 113, and a red light source 111. While the plurality of light sources can be various types of light sources, in this illustrative embodiment they are laser light sources. Accordingly, the green light source 112 comprises a green laser light source. Similarly, the blue light source 113 comprises a blue laser light source and the red light source 111 comprises a red laser light source. The red laser light source, green laser light source, and blue light source are indicated in FIG. 1 with the "R," "G," and "B." Where lasers are used as the light sources, the lasers can be any of a variety of types of lasers, including semiconductor lasers such as edge-emitting lasers or vertical cavity surface emitting lasers. Such semiconductor lasers are well known in the art and are commonly available from a variety of manufacturers.

In the illustrative embodiment of FIG. 1, the powered optical elements 108,109,110 are configured such that light exits the plurality of light sources 111,112,113 with a particular orientation. As noted above, the light beams 104,105,106 are configured to converge as they move towards the spatial light modulator 101 at such an angle that the image plane 117 is created at a desired location between the spatial light modulator 101 and the second optical element 115. Accordingly, the pixels created by the light beams 104,105,106 will not be focused along the surface of the spatial light modulator 101, but will rather be focused at the image plane 117.

However, the designer can tailor the amount of convergence to fit a necessary modulator area, and thus is able to use a smaller modulator mirror by imparting more convergence on the light beams 104,105,106.

In one embodiment, the spatial light modulator 101 can be a MEMS scanning mirror, such as those manufactured by Microvision, Inc. Examples of MEMS scanning mirrors, such as those suitable for use with embodiments of the present invention, are set forth in commonly assigned U.S. patent application Ser. No. 11/786,423, filed Apr. 10, 2007, entitled, "Integrated Photonics Module and Devices Using Integrated Photonics Module," which is incorporated herein by reference, and in U.S. Published patent application Ser. No. 10/984,327, filed Nov. 9, 2004, entitled "MEMS Device Having Simplified Drive," which is incorporated herein by reference. A MEMS light modulator is well suited to embodiments of the invention due to its compact construction, cost effectiveness, and reliability. While a MEMS device will be used herein for discussion purposes, it will be clear to those of ordinary skill in the art having the benefit of the disclosure that other modulator platforms may be used as well.

In one or more embodiments, the spatial light modulator 101 is responsive to a driver and a control circuit 125. The control circuit 125 can comprise one or more processors that execute instructions stored in a corresponding memory. The control circuit 125 and driver, in one embodiment are configured to deliver a drive signal to the spatial light modulator 101 based upon video or image data, which may be stored in a memory that is operable with the control circuit 125. The driver can then cause the spatial light modulator 101 to sweep the scanned light 116 to form the image 102. In one embodiment, the spatial light modulator 101 is configured to form the image 102 by moving in a raster pattern. Each raster scan of the raster pattern can comprise a frame of image content. Each raster scan can refresh image content by redrawing it. The refresh rate is 60 Hz in one embodiment. In other embodiments, other sub-120 Hz frequencies can be used, including 75 Hz, 80 Hz, or 90 Hz. In conjunction with modulation of the light sources 111,112,113, the driver is operative to pivot the spatial light modulator 101 of FIG. 1 about a first axis and second axis by delivering a control signal to the spatial light modulator 101. This pivoting action causes the scanned light to move horizontally and vertically to form the image 102.

Turning now to FIG. 2, illustrated therein is an alternate embodiment of an imaging system 200 configured in accordance with one or more embodiments of the invention. While the imaging system (100) of FIG. 1 delivered light on a direct path to the spatial light modulator (101), the imaging system 200 of FIG. 2 delivers light along an indirect path to the spatial light modulator 201. Specifically, a reflective optical element 207 is disposed between the light sources 211,212,213 and the spatial light modulator 201. Additionally, as mentioned above, the embodiment of FIG. 2 illustrates the use of dichroic mirrors 223,224,225 as an intermediate optical alignment device 222 configured to collimate the light beams 204,205,206 into a common beam 226.

As shown in FIG. 2, light beams 204,205,206 are emitted from the light sources 211,212,213 in a substantially parallel orientation. Each light beam 204,205,206 is directed to dichroic mirrors 223,224,225, which are used as an optical alignment device 222 that collimates the light beams 204,205,206 into a collimated beam 226. Dichroic mirrors 223,224,225 are partially reflective mirrors that include dichroic filters that selectively pass light in a narrow wavelength bandwidth while reflecting others. In one embodiment, polarizing coatings can be incorporated into the dichroic mirrors as well. Dichroic mirrors and their use in laser-based projection systems are known in the art and, as such, will not be discussed in further detail here. Note that the location, as well as the number, of the dichroic mirrors 223,224,225 can vary based upon application. For example, as noted with reference to FIG. 1, in some MEMS-type scanning systems the light beams 204,205,206 can be encoded directly into the scanning mirror.

The reflective optical element 207 then functions as a converging reflective element in that it causes the collimated light beam 226 to converge after reflection from the reflective optical element 207 as it travels along an optical axis 214 defined between the reflective optical element 207 and the spatial light modulator 201.

The remainder of the imaging system 200 of FIG. 2 then functions substantially in the same fashion as the imaging system (100) of FIG. 1. The reflective optical element 207 and the spatial light modulator 201 are arranged such that an intermediate image plane 217, where each pixel of the scanned light 216 is in focus, exists between the spatial light modulator 201 and a second optical element 215. The second optical element 215 is then configured to collect diverging light 218 from the image plane 217 and reimage it to a finite or infinite conjugate. This can include collimating the collected, diverging light.

In one or more embodiments, the second optical element 215 comprises a doublet for color correction. The second optical element 215 then causes the collimated light 219 to converge at an output side of the second optical element 215 along a second optical axis 224 to a pupil 220. In the illustrative embodiment of FIG. 2, the pupil 220 occurs at the output of the image projection system 200. Accordingly, the collimated light 219 diverges again to a projection surface 223 where the image 202 is formed. The combination of the reflective optical element 207, which delivers the converging beam cone to the spatial light modulator 201, and the second optical element 215 that creates a subsequent pupil 220 provides the designer with the flexibility to use smaller components. This will become clearer in the discussion of FIG. 4 that follows.

Turning now to FIG. 3, another imaging system 300 is shown. The imaging system 300 of FIG. 3 is similar to that shown in FIG. 2. However, a beam combiner 330 is used to collimate light 304,305,306 into a collimated beam 326. Once output from the beam combiner 330, the collimated beam 326 can be delivered to a reflective optical element 307 to cause the collimated beam 326 to converge as described above with reference to FIG. 2. Alternatively, an intermediate optical element 337 can be used to cause the convergence and deliver light to the spatial light modulator 301.

Additionally, the imaging system 300 of FIG. 3 includes a reflective element 330 disposed on an opposite side of the second optical element 315 relative to the spatial light modulator 301. The reflective element 330 can take a variety of forms. In the illustrative embodiment of FIG. 3, the reflective element 330 is a mirror configured to redirect an output beam 331 of the imaging system 300. Designers may employ such devices to alter the geometry of the overall imaging system 300 to fit within a predetermined housing or form factor.

In other embodiments, the reflective element 330 can be other types of devices. For example, in one embodiment the reflective element 330 comprises a second spatial light modulator configured so scan the output beam 331 along the projection surface 323. In one embodiment, the second optical element 315 is configured to relay the image plane 317 off the reflective element 330 at an infinite conjugate to create an infinite focus image projection system. At the same time, the second optical element 315 can be configured to create a small pupil at the reflective element 330.

As shown in FIG. 3, the second optical element 315 is configured to cause the diverging light 318 from the intermediate image plane 317 to converge along a second optical axis 324 defined between the second optical element 315 and the reflective element 330. In this illustrative embodiment, the second optical element 315 causes the diverging light 318 to converge to a pupil at the reflective element 330. The reflective element 330 then redirects the diverging light 318 as an output beam 331 to the projection surface. The output beam 331 expands from the pupil at the reflective element 330 to form the image 302 on the projection surface 323.

Figure 7:
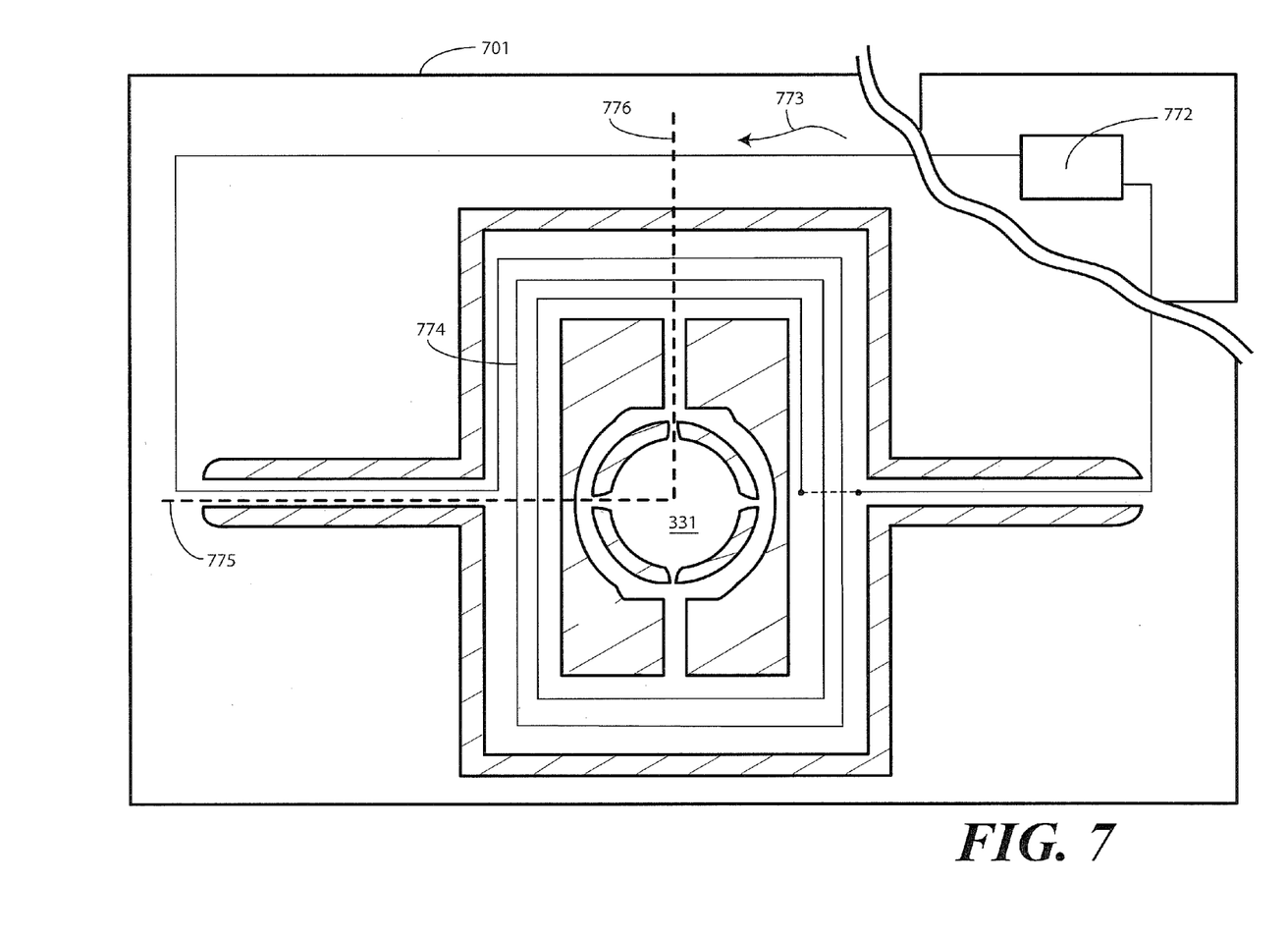
FIG. 7 illustrates one embodiment of a spatial light modulator suitable for use with one or more embodiments of a scanned image projection system employing an intermediate image plane in accordance with embodiments of the invention.

Turning briefly to FIG. 7, illustrated therein is one explanatory embodiment of a spatial light modulator 701 suitable for use with embodiments of the invention shown in FIGS. 1-3. This embodiment is illustrative only, as other forms of modulating and scanning devices will be obvious to those of ordinary skill in the art having the benefit of this disclosure.

As noted above, one or more embodiments can employ a MEMS scanning platform such as that described in commonly assigned U.S. patent application Ser. No. 12/496,892 to Brown et al., entitled, "Phase Locked Resonant Scanning Display Projection," which is incorporated herein by reference. Such a spatial light modulator 701 is shown in FIG. 7. Note that there are many different ways in which a spatial light modulator can be constructed, and the MEMS scanning platform is but one example. Further, other spatial light modulators can be substituted for the spatial light modulator 701 of FIG. 7, which is illustrative only.

The principal scanning component of the spatial light modulator 701 is a scanning mirror 771. A driver 772, which may be integrated with a control circuit, delivers a drive signal 773 to a drive coil 774 disposed about the scanning mirror 771. The drive signal 773 causes a corresponding current to pass through the windings of the drive coil 774. An external magnetic field source disposed near the light encoder (not shown) imposes a static magnetic field on the drive coil 774. The magnetic field has a component in the plane of the coil, and is oriented non-orthogonally with respect to the two drive axes 775,776. The in-plane current in the windings of the drive coil 774 interacts with the in-plane magnetic field component to produce out-of-plane Lorentz forces on the conductors of the drive coil 774. As the drive current forms a loop, the current reverses sign across the scan axes, which causes the Lorentz forces to also reverse sign across the scan axes, thereby causing the application of mechanical torque. This combined torque produces responses in the two scan directions, depending on the frequency content of the torque, thereby causing motion about the axes 775,776. This motion permits the driver 772, or the control circuit via the driver, to scan an image on a projection surface.

FIGS. 1 and 2 each employ a single spatial light modulator capable of scanning along two axes. However, it can be desirable to separate employ multiple spatial light modulators in some embodiments. For example, in some systems employing a two-axis spatial light modulator, image artifacts can occur due to crosstalk in the vertical and horizontal drive signals. Said differently, when a two-axis mirror is driven both in the horizontal and vertical directions, image artifacts can result when there is not strong isolation between the vertical and horizontal signals. Illustrating by example, sinusoidal image brightness variation can occur from image top to image bottom. At times this sinusoidal image brightness variation can roll. Thus, accordingly, in one or more embodiments, separating the spatial light modulation function can be advantageous. Moreover, when one splits the modulation into two devices, different technologies can be selected for different modulators—one can be a PV electric (comb drive) modulator and one can be a magnetic resonant scanning modulator. Accordingly, separation can allow a designer to use a preferred technology from a size and/or cost standpoint.

Figure 4:
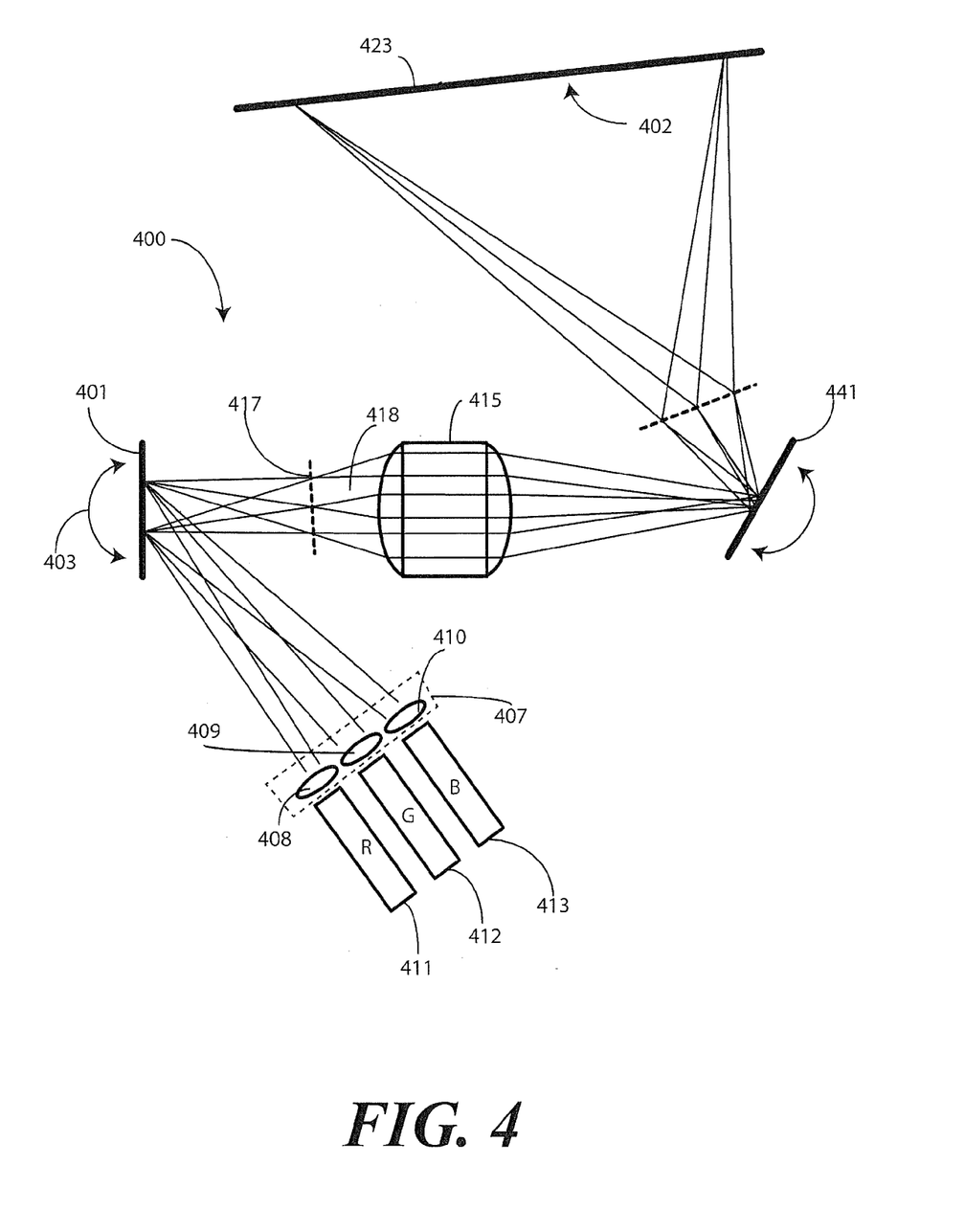
FIG. 4 illustrates yet another scanning image projection system employing an intermediate image plane in accordance with one or more embodiments of the invention.

Turning now to FIG. 4, illustrated therein is an imaging system 400 employing spilt modulating devices. As shown in FIG. 4, a first spatial light modulator 401 is disposed on a first side of a second optical element 415. A second spatial light modulator 441 is disposed on a second side of the second optical element 415 opposite the first side. While the first spatial light modulator 401 and the second spatial light modulator 441 can each be two-axis scanning devices, in the illustrative embodiment of FIG. 4 the first spatial light modulator 401 scans only along a single axis, while the second spatial light modulator 441 also scans only along a single axis. In one embodiment, the scanning axis of the first spatial light modulator 401 and the scanning axis of the second spatial light modulator 441 are substantially orthogonal such that the combined scanning of the first spatial light modulator 401 and the second spatial light modulator 441 can result in a raster pattern.

Figure 8:
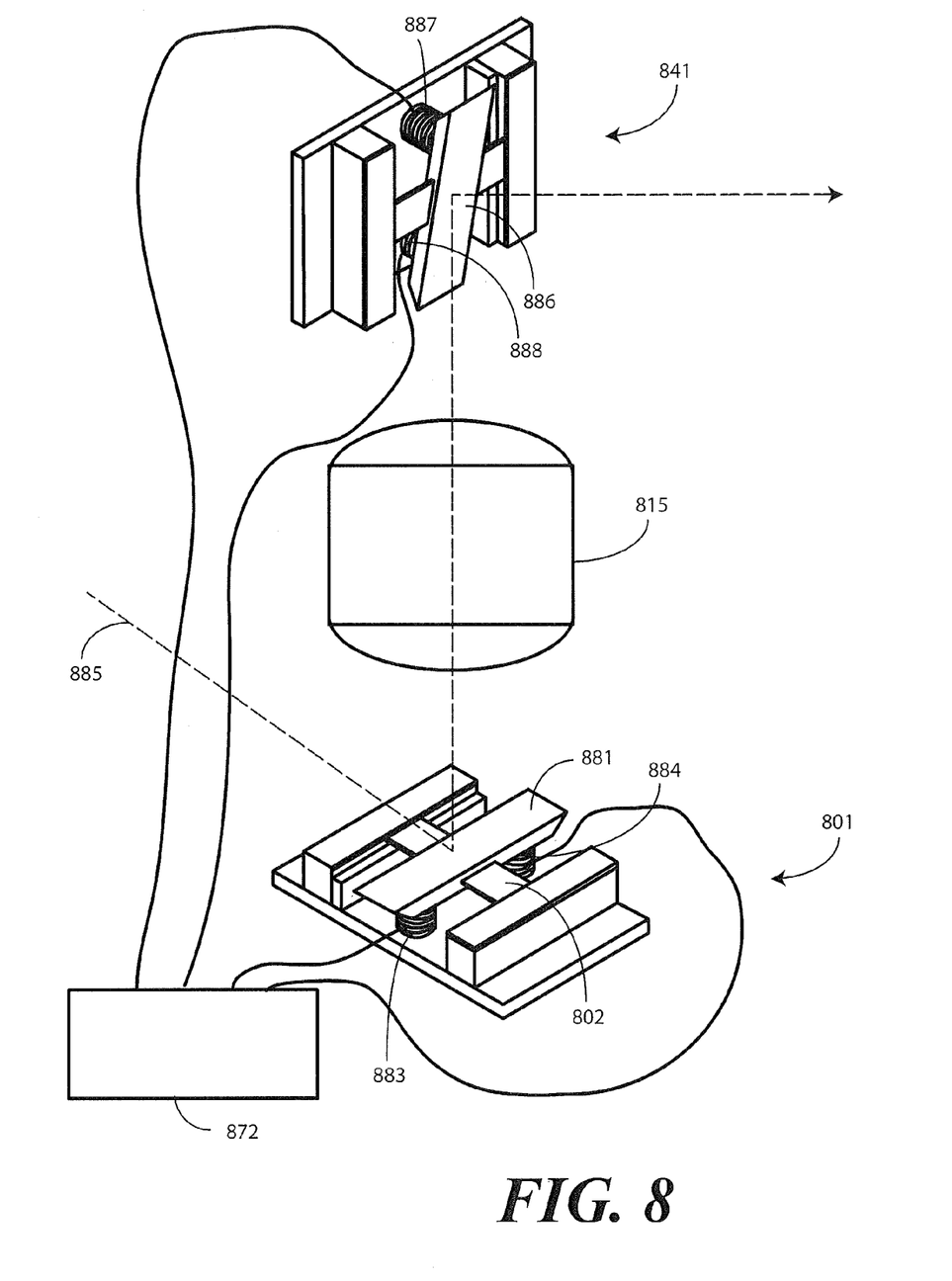
FIG. 8 illustrates another embodiment of a spatial light modulator in use with one or more embodiments of a scanned image projection system employing an intermediate image plane in accordance with embodiments of the invention.

Turning briefly to FIG. 8, illustrated therein is a more detailed view of one embodiment of a split scanning system. The design of FIG. 8 is but one explanatory embodiment, as others will be obvious to those of ordinary skill in the art having the benefit of this disclosure. In the illustrative embodiment of FIG. 8, the first spatial light modulator 801 and the second spatial light modulator 841 are made from the same technology. As noted above, in some embodiments different technologies can be selected for the first spatial light modulator 801 and the second spatial light modulator 841. Accordingly, the embodiment of FIG. 8 is illustrative only.

As shown in FIG. 8, the first spatial light modulator 801 is disposed opposite the second optical element 815 relative to the second spatial light modulator 841. The first spatial light modulator 801 and the second spatial light modulator 841 are both resonant scanners in this illustration. Using the first spatial light modulator 801 as an example, the principal scanning component is a moving mirror 881 mounted to a spring plate 882. The dimensions of the mirror 881 and spring plate 882, as well as the material properties of the spring plate 882, can be selected so that the mirror 881 and spring plate 882 have a high Q with a natural oscillatory ("resonant") frequency on the order of 1-100 kHz. The selected resonant frequency can depend upon the application. For VGA quality output with a 60 Hz refresh rate and no interlacing, the resonant frequency is preferably about 15-20 kHz.

A ferromagnetic material mounted with the mirror 881 is driven by a pair of electromagnetic coils 883,884 to provide motive force to mirror 881, thereby initiating and sustaining oscillation. The ferromagnetic material can be manufactured so as to be integral to the spring plate 882 and body of the mirror 881. A driver 872 provides electrical signals to activate the coils 883,884. Responsive to the electrical signals, the coils 883,884 produce periodic electromagnetic fields that apply force to the ferromagnetic material, thereby causing oscillation of the mirror 881. If the frequency and phase of the electric signals are properly synchronized with the movement of the mirror 881, the mirror 881 oscillates at its resonant frequency with little power consumption.

When light passes through the system, it interacts with the mirror 881 of the first spatial light modulator 801 first. It then passes through the second optical element 815 to the mirror 886 of the second spatial light modulator 841. One of the first spatial light modulator 801 or the second spatial light modulator 841 can be configured to scan along a first axis, while another of the first spatial light modulator 801 and the second spatial light modulator can be configured to scan along a second axis. Illustrating by example, where the first spatial light modulator 801 is configured to sweep the vertical axis of a raster pattern, it will be referred to as the "slow scan" device while the second spatial light modulator 841, configured to scan the horizontal axis of a raster pattern, will be referred to as the "fast scan" device. Either the first spatial light modulator 801 or the second spatial light modulator 841 can be the slow scan device, and vice versa.

As shown in FIG. 8, the second spatial light modulator 841 is configured as the slow scan device. The slow scan device is structured very similarly, in this illustrative embodiment, to the fast scan device, i.e., first spatial light modulator 801. Like the slow scan device, the fast scan device includes a mirror 886 driven by a pair of coils 887,888 in response to electrical signals from the driver 872. However, because the rate of oscillation is much lower for vertical scanning, the slow scan device can be configured as a non-resonant device, or alternatively may employ another non-resonant technology. The mirror 886 receives light 885 passing through the second optical element 815 from the fast scan device and produces vertical deflection, which occurs in one embodiment at about 30-100 Hz. While in prior art designs the mirror 886 had to be significantly larger than mirror 881, the inclusion of the second optical element 815 allows the pupil to be placed at mirror 886, thereby allowing a smaller mirror to be used. The second optical element 815 also reduces constraints on the positioning of the slow scan device due to the fact that the pupil created by the second optical element 815 can be moved in accordance with the design of the second optical element.

The light sources (not shown) output a plurality of light beams that are modulated according to an image signal from the driver 872. At the same time, the driver 872 activates the coils 883,884,887,888 to manipulate the mirrors 881,886. In this illustrative embodiment, the modulated beam of light strikes mirror 881, and is deflected horizontally by an angle corresponding to the instantaneous angle of the mirror 881. The deflected light then forms an image plane 817 prior to reaching the second optical element 815 and passes through the second optical element 815. The light is then caused to converge to a pupil as it strikes mirror 886, where it is deflected at a vertical angle corresponding to the instantaneous angle of mirror 886. The modulation of the optical beam is synchronized with the horizontal and vertical scans so that at each position of the mirrors, the beam color and intensity correspond to a desired virtual image.

It will be clear to those of ordinary skill in the art having the benefit of this disclosure that other components of the scanning system have been omitted for clarity of presentation. For example, the first spatial light modulator 801 and second spatial light modulator 841 are typically mounted in fixed relative positions within a housing. Additionally, as will be shown in FIG. 9 below, the system can include one or more turning mirrors that direct the beam such that the beam strikes each of the mirrors a plurality of times to increase the angular range of scanning Turning now back to FIG. 4, a first optical element 407 is disposed at an output of the plurality of light sources 411,412, 413. As with FIG. 1 above, the first optical element 407 of FIG. 4 is configured as three optical elements 408,409,410 disposed at the outputs of the light sources 411,412,413. The first optical element 407 is configured to cause the plurality of light beams 404,405,406 emanating from the light sources 411,412,413 to converge along an optical path defined between the first optical element 407 and the spatial light modulator 401. The second optical element 415 is then disposed between the first spatial light modulator 401 and the second spatial light modulator 441. Note that FIG. 4 could have employed the beam combiner (330) of FIG. 3 instead of the first optical element 407, provided a reflector was included to cause the output of the beam combiner (330) to converge to create the intermediate image plane 417.

Light reflected from the first spatial light modulator 401 creates an intermediate image plane 417 between the spatial light modulator 401 and the second optical element 415. The second optical element 415 then collects diverging light 418 from the image plane 417, collimates the light, and delivers the light to the second spatial light modulator 441. In one embodiment, the second optical element 415 causes the light to converge to a pupil at the second spatial light modulator 441. The second spatial light modulator 441 scans the light to form the image 402 on the projection surface 423.

In the imaging system 400 of FIG. 4, the arrangement of the optical elements results in zero "walk" of the pupil created on the second spatial light modulator 441 since the second spatial light modulator 441 is disposed at the pupil plane of the second optical element 415. This allows the effective Θ*D product to be decoupled, thereby allowing for a much larger Θ*D product than if the pupil occurred on a single mirror. Moreover, experimental testing has shown that the imaging system 400 can be configured to have no vertical smile distortion despite not having an output correction optical device.

Figure 5:
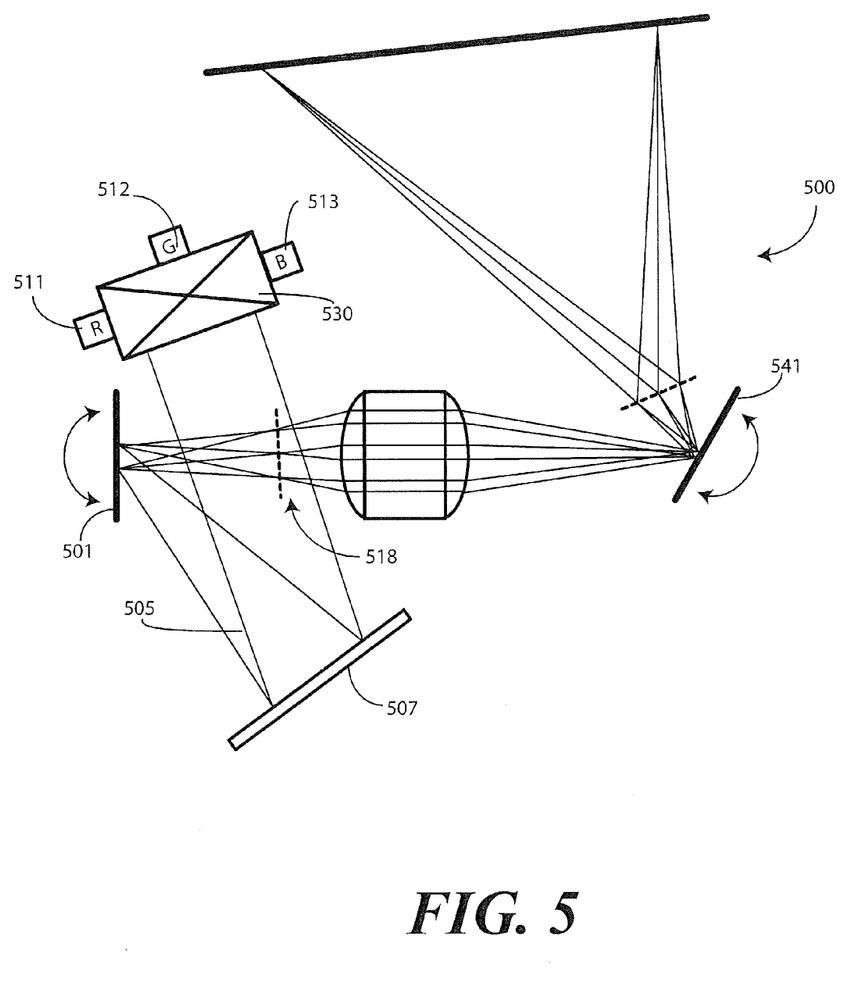
FIG. 5 illustrates yet another scanning image projection system employing an intermediate image plane in accordance with one or more embodiments of the invention.

Turning now to FIG. 5, illustrated therein is an "indirect" imaging system 500 that is analogous to that shown in FIG. 2, but that uses two spatial light modulators 501,541. As shown in FIG. 5, light beams 504,505,505 delivered to a beam combiner 530. The light then leaves the beam combiner 530 in a converging fashion, with convergence being responsible for the creation of the intermediate image plane 517. The addition of the reflective optical element 507, which in this embodiment is a flat mirror, allows for a smaller overall form factor. The beam combiner 530, or optionally one or more intermediate optical devices, function as the converging element in that the light beams 504,505,506 converge as they travel along an optical axis defined both between the light sources 511,512,513 and the reflective optical element 507, and between the reflective optical element 507 and the first spatial light modulator 501.

The remainder of the imaging system 500 of FIG. 5 then functions substantially in the same fashion as the imaging system (400) of FIG. 4. The reflective optical element 507 and the spatial light modulator 501 are arranged such that an intermediate image plane 517 is created between the spatial light modulator 501 and the second optical element 515. The second optical element 515 is then configured to collect diverging light 518 from the image plane 517 and collimate the collected, diverging light. The second optical element 515 then creates a pupil at the second spatial light modulator 541 as described above.

Figure 6:
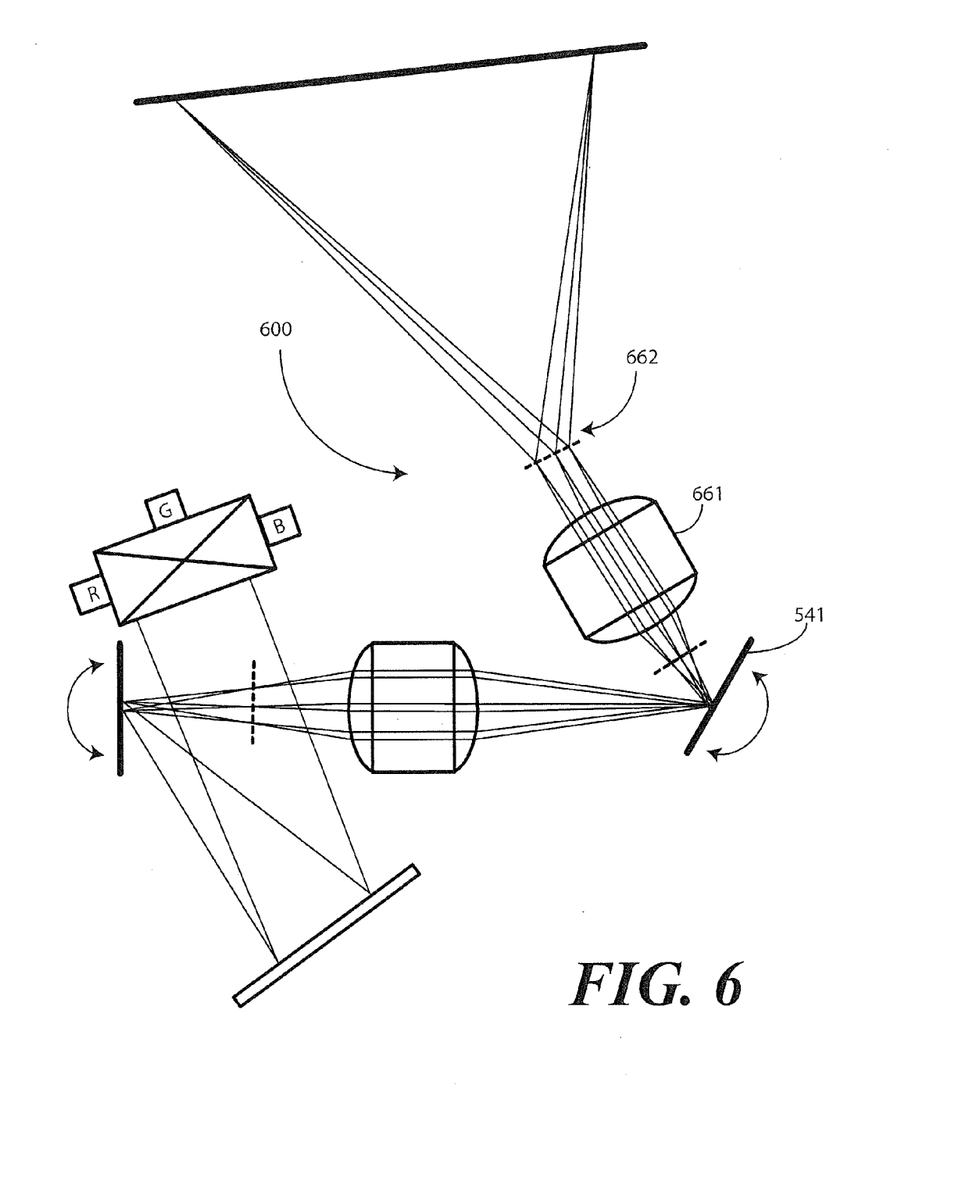
FIG. 6 illustrates yet another scanning image projection system employing an intermediate image plane in accordance with one or more embodiments of the invention.

Turning to FIG. 6, illustrated therein is an imaging system 600 employing a third optical element 661. The third optical element 661 can be used with any of the aforementioned embodiments, but is shown illustratively in FIG. 6 as being used with the imaging system (500) of FIG. 5. In the illustrative embodiment of FIG. 6, the third optical element 661 is disposed between the reflective element formed by the second spatial light modulator 541 and the output of the imaging system 600. The third optical element 661 is configured to collect reflected light from the second spatial light modulator 541 and create a pupil 662 on a side of the third optical element 661 disposed opposite the second spatial light modulator 541. The third optical element 661 can be used to relay the output image to a farther point by creating a pupil 662 at a predefined location outside the imaging system 600.

Figure 9:
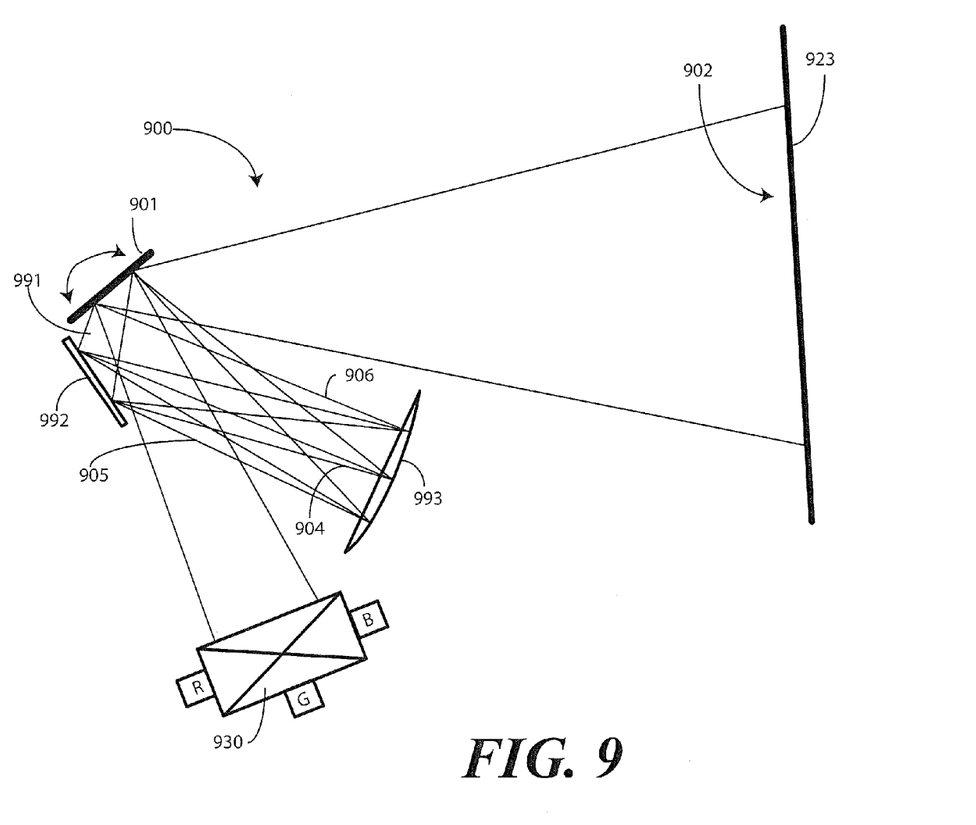
FIG. 9 illustrates yet another scanning image projection system employing an intermediate image plane in accordance with one or more embodiments of the invention.

Turning to FIG. 9, illustrated therein is another imaging system 900 configured in accordance with one or more embodiments of the invention. As noted in the discussion of FIG. 8, embodiments of the invention can include one or more turning mirrors that direct the beam such that the beam strikes each of the mirrors a plurality of times to increase the angular range of scanning available by a spatial light modulator. The embodiment of FIG. 9 includes such turning mirrors.

Specifically, as shown in FIG. 9, a spatial light modulator 901 is configured to produce images 902 by scanning a plurality of light beams that have been combined by a beam combiner 930. The beam combiner 930 also causes the combined beam to converge as it moves toward the spatial light modulator 901. The spatial light modulator 901 takes the combined, converging beam and scans it as scanned light 991. The imaging system 900 includes a first reflector 992 and a second reflector 993. The second reflector 993 of this illustrative embodiment comprises a concave mirror.

As shown in FIG. 9, the first reflector 992 is arranged so as to redirect the scanned light 991 received from the spatial light modulator 901 to the second reflector 993. The second reflector 993 is then arranged so as to redirect the scanned light 991 again to the spatial light modulator 901. The second reflector 993 further causes the scanned light 991 to converge along an optical axis defined between the second reflector 993 and the spatial light modulator 901. The spatial light modulator 901, which is a MEMS scanning device in one embodiment, then re-scans the light to form the image 902 on the projection surface 923. Where the second reflector 993 is configured to create a pupil at the spatial light modulator 901, a smaller mirror surface can be used.

Figure 10:
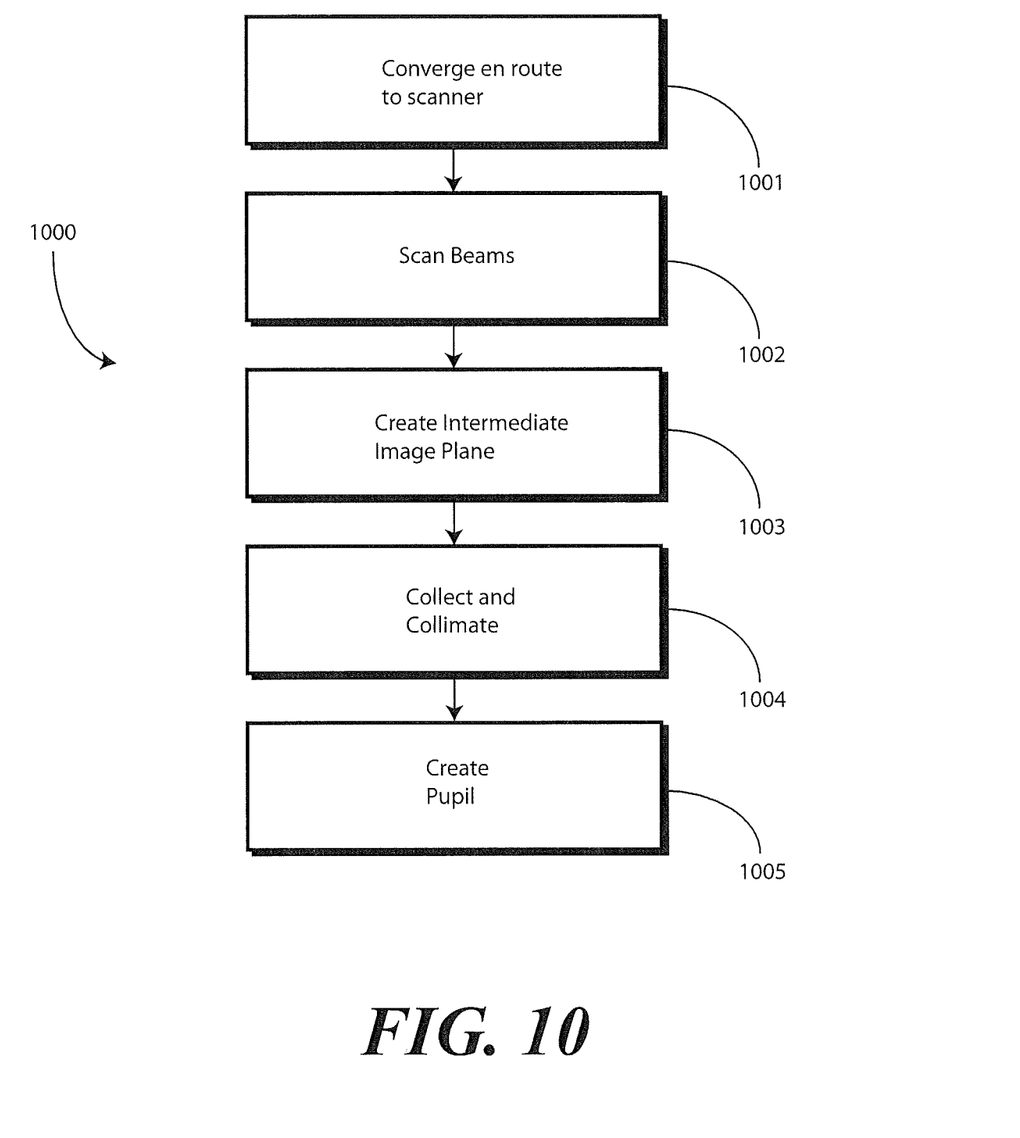
FIG. 10 illustrates a method of employing an intermediate image plane in a scanned projection system configured in accordance with one or more embodiments of the invention.

Turning to FIG. 10, illustrated therein is a method 1000 of producing images that occurs in one or more of the imaging systems shown above. At step 1001, the method 1000 causes, with a first optical element, a light beam or plurality of light beams to converge as the beam(s) travel to a spatial light modulator. At step 1002, the method 1000 scans a plurality of light beams with a spatial light modulator. At step 1003, the convergence occurring in step 1001 creates an image plane between the spatial light modulator and an optical element disposed between the spatial light modulator and an output of the imaging system.

At step 1004, the method 1000 collects, with a second optical element, diverging light from the image plane and collimates the diverging light. At step 1005, the method 1000 delivers the plurality of light beams to a pupil with the second optical element. In one embodiment, step 1005 occurs such that the pupil is an image pupil placed on a reflective element or additional spatial light modulator. As shown and described, the methods and systems above allow for relaxed mirror and device requirements while still meeting high resolution and small form factor design requirements.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. An imaging system, comprising:
    a spatial light modulator configured to produce images by scanning a plurality of light beams on two axes in a raster pattern;
    a first optical element configured to cause the plurality of light beams to converge along an optical path defined between the first optical element and the spatial light modulator; and
    a second optical element disposed between the spatial light modulator and an output of the imaging system;
    wherein the first optical element and the spatial light modulator are arranged such that an image plane exists between the spatial light modulator and the second optical element.

2. The imaging system of claim 1, wherein the first optical element comprises a powered optical element disposed at an output of a plurality of light sources.

3. The imaging system of claim 2, wherein the powered optical element comprises a plurality of powered optical elements.

4. The imaging system of claim 3, further comprising the plurality of light sources configured to produce the plurality of light beams, wherein the plurality of powered optical elements correspond to the plurality of light sources on a one to one basis.

5. The imaging system of claim 1, wherein the first optical element comprises a converging reflective element.

6. The imaging system of claim 5, further comprising:
    a plurality of light sources configured to produce the plurality of light beams; and
    one or more powered optical elements disposed at the output of the plurality of light sources.

7. The imaging system of claim 1, wherein the second optical element is configured to collect diverging light from the image plane and reimage the diverging light to one of a finite or infinite conjugate.

8. The imaging system of claim 7, further comprising a reflective element disposed on an opposite side of the second optical element relative to the spatial light modulator.

9. The imaging system of claim 8, wherein the second optical element is configured to cause the diverging light to converge along a second optical axis defined between the second optical element and the reflective element.

10. The imaging system of claim 9, wherein the second optical element is configured to cause the diverging light to converge to a pupil at or near the reflective element.

11. The imaging system of claim 8, further comprising a third optical element disposed between the reflective element and the output of the imaging system, wherein the third optical element is configured to collect reflected light from the reflective element and create a pupil on a side of the third optical element disposed opposite the reflective element.

12. The imaging system of claim 1, wherein the second optical element comprises a doublet.

13. An imaging system, comprising:
    a spatial light modulator configured to produce images by scanning a plurality of light beams as scanned light;
    a first reflector; and
    a second reflector;
    wherein the first reflector is arranged so as to redirect the scanned light received from the spatial light modulator to the second reflector; and
    wherein the second reflector is arranged so as to redirect the scanned light again to the spatial light modulator and cause the scanned light to converge along an optical axis defined between the second reflector and the spatial light modulator.

14. The imaging system of claim 13, wherein the spatial light modulator comprises a scanning mirror.

15. The imaging system of claim 13, wherein the second reflector comprises a concave mirror.

* * * * *